US012776021B2

(12) United States Patent
Strong

(10) Patent No.: US 12,776,021 B2
(45) Date of Patent: Oct. 27, 2026

(54) ROOF CONDITION ASSESSMENT USING MACHINE LEARNING

(71) Applicant: Pictometry International Corp., Rochester, NY (US)

(72) Inventor: Shadrian Strong, Bellevue, WA (US)

(73) Assignee: Pictometry International Corp., Rochester, NY (US)

( * ) Notice: Subject to any disclaimer, the term of this patent is extended or adjusted under 35 U.S.C. 154(b) by 517 days.

(21) Appl. No.: 18/455,094

(22) Filed: Aug. 24, 2023

(65) Prior Publication Data

US 2023/0394646 A1 Dec. 7, 2023

Related U.S. Application Data

(62) Division of application No. 16/893,090, filed on Jun. 4, 2020, now Pat. No. 11,776,104.

(Continued)

(51) Int. Cl.
*G06N 20/00* (2019.01)
*G06F 16/29* (2019.01)
(Continued)

(52) U.S. Cl.
CPC ............ *G06T 7/0004* (2013.01); *G06F 16/29* (2019.01); *G06F 18/2155* (2023.01);
(Continued)

(58) Field of Classification Search
CPC .... G06V 10/751; G06V 20/176; G06F 16/29; G06F 18/2155; G06F 18/2415;
(Continued)

(56) References Cited

U.S. PATENT DOCUMENTS 7,424,133 B2 9/2008 Schultz et al.
7,650,047 B2 1/2010 Jin et al.
(Continued)

FOREIGN PATENT DOCUMENTS

GB 2554361 A 4/2018
WO WO 2006/120724 11/2016
WO WO2018/071983 A1 4/2018

OTHER PUBLICATIONS

ESRI, Getting Started with ArcGIS, 2005, available at: <http://downloads.esri.com/support/documentation/ao_/1003Getting_Started_with_ArcGIS.pdf >, downloaded on Sep. 1, 2019 (Year: 2005).
(Continued)

*Primary Examiner* — Sheela C Chawan
(74) *Attorney, Agent, or Firm* — Dunlap Codding, P.C.

(57) ABSTRACT

Systems and methods for roof condition assessment from digital images using machine learning are disclosed, including receiving an image of a structure having roof characteristic(s), first pixel values depicting the structure, second pixel values outside of the structure depicting a background surrounding the structure, and first geolocation data; generating a synthetic shape image of the structure from the image using machine learning, including pixel values forming a synthetic outline shape, and having second geolocation data; mapping the synthetic shape onto the image, based on the first and second geolocation data, and changing the second pixel values so as to not depict the background; assessing roof characteristic(s) based on the first pixel values with a second machine learning algorithm resulting in a plurality of probabilities, each for a respective roof condition classification category, and determining a composite probability based upon the plurality of probabilities so as to classify the roof characteristic(s).

19 Claims, 6 Drawing Sheets

Related U.S. Application Data

(60) Provisional application No. 62/903,469, filed on Sep. 20, 2019.

(51) Int. Cl.
*G06F 18/214* (2023.01)
*G06F 18/2415* (2023.01)
*G06T 7/00* (2017.01)
*G06V 20/10* (2022.01)

(52) U.S. Cl.
CPC ......... *G06F 18/2415* (2023.01); *G06N 20/00* (2019.01); *G06V 20/176* (2022.01)

(58) Field of Classification Search
CPC .......... G06N 20/00; G06T 2207/10032; G06T 2207/20081; G06T 2207/20084
USPC .................................................. 382/100, 224
See application file for complete search history.

(56) References Cited

U.S. PATENT DOCUMENTS

| | | | | |
|---|---|---|---|---|
| 8,259,993 | B2 | 9/2012 | Sasakawa et al. | |
| 8,285,050 | B2 | 10/2012 | Ozawa | |
| 8,385,672 | B2 | 2/2013 | Giuffrida et al. | |
| 8,462,992 | B2 | 6/2013 | Chen et al. | |
| 9,389,084 | B1 | 7/2016 | Chen et al. | |
| 9,805,261 | B1 | 10/2017 | Loveland et al. | |
| 10,977,490 | B1 | 4/2021 | Bokshi-Drotar et al. | |
| 2002/0051572 | A1 | 5/2002 | Matsumoto et al. | |
| 2009/0067725 | A1 | 3/2009 | Sasakawa et al. | |
| 2010/0246971 | A1 | 9/2010 | Ohtsubo et al. | |
| 2013/0155109 | A1 | 6/2013 | Schultz et al. | |
| 2015/0227808 | A1 | 8/2015 | Zharkov | |
| 2016/0005097 | A1 | 1/2016 | Hsiao et al. | |
| 2016/0027051 | A1 | 1/2016 | Gross | |
| 2016/0217537 | A1 | 7/2016 | Childs | |
| 2016/0239956 | A1 | 8/2016 | Kang et al. | |
| 2016/0259994 | A1 | 9/2016 | Ravindran et al. | |
| 2016/0371801 | A1 | 12/2016 | Dawson | |
| 2017/0091627 | A1 | 3/2017 | Terrazas et al. | |
| 2017/0206648 | A1 | 7/2017 | Marra et al. | |
| 2017/0236024 | A1 | 8/2017 | Wang et al. | |
| 2017/0308549 | A1 | 10/2017 | Sims et al. | |
| 2017/0352100 | A1* | 12/2017 | Shreve | G06T 7/168 |
| 2018/0075168 | A1 | 3/2018 | Tiwari et al. | |
| 2018/0089531 | A1 | 3/2018 | Geva et al. | |
| 2018/0089833 | A1 | 3/2018 | Lewis et al. | |
| 2018/0247416 | A1 | 8/2018 | Ruda et al. | |
| 2019/0065907 | A1 | 2/2019 | Strong et al. | |
| 2019/0155973 | A1 | 5/2019 | Morczinek et al. | |
| 2019/0213412 | A1 | 7/2019 | Kottenstette et al. | |
| 2019/0271550 | A1 | 9/2019 | Breed et al. | |
| 2020/0019825 | A1 | 1/2020 | Frei et al. | |
| 2020/0348132 | A1 | 11/2020 | Du et al. | |
| 2021/0158609 | A1 | 5/2021 | Raskob et al. | |

OTHER PUBLICATIONS

Holt, Alec, "Spatial similarity and GIS: the grouping of spatial kinds," 1999, available at: < https://pdfs.semanticscholar.org/1 ff7/49c905db58bb884a9d6609de9452edf7921 b.pdf >, downloaded on Sep. 1, 2019 (Year: 1999).

Artificial Neural Networks Technology, [online], archived on Nov. 23, 2015, available at:<https://web.archive.org/web/20151123211404/http://www2.psych.utoronto.ca/users/reIngold/course> (Year: 2015).

Marr, Bernard, "A Short History of Machine Learning—Every Manager Should Read," [online], Feb. 19, 2016, available at: < https://www .forbes.com/sites/bernardmarr/2016/02/19/a-short-history-of-machine-learning-every-manager-should-read/#70f07e5415e7 > (Year: 2016).

Krizhevsky et al., "ImageNet Classification with Deep Convolutional Neural Networks," Advances in Neural Information Processing Systems 25, pp. 1097-1105, 2012.

Long et al., "Fully Convolutional Networks for Semantic Segmentation," IEEE Conference on Computer Vision and Pattern Recognition, Jun. 2015.

Goodfellow, et al., "Generative Adversarial Networks," Departement d'informatique et de recherche operationnelle Universite de Montreal, Jun. 2014.

Simonyan et al., "Very Deep Convolutional Networks for Large-Scale Image Recognition" International Conference on Machine Learning, 2015.

Qin et al., "3D Change Detection—Approaches and Applications", ISPRS Journal of Photogrammetry and Remote Sensing, pp. 41-56, 2016.

Bouziani et al., "Automatic Change Detection of Buildings in Urban Environment from Very High Spatial Resolution Images Using Existing Geodatabase and Prior Knowledge", ISPRS Journal of Photogrammetry and Remote Sensing, pp. 143-153, 2010.

Taneja et al., "Image Based Detection of Geometric Changes in Urban Environments", 2011 International Conference on Computer Vision, 2011.

Ruf et al., "Towards Real-Time Change Detection in Videos Based on Existing 3D Models", Image and Signal Processing for Remote Sensing XXII, vol. 10004, 2016.

Leichtle et al., "Unsupervised Change Detection in VHR Remote Sensing Imagery—An Object Based Clustering Approach in a Dynamic Urban Environment", International Journal of Applied Earth Observation and Geoinformation 54, pp. 15-27, 2017.

European Patent Office acting as the International Searching Authority; International Search Report and Written Opinion regarding PCT/US2020/036138, dated Oct. 2, 2020.

Galarreta et al., "UAV-based Urban Structural Damage Assessment Using Object-based Image Analysis and Semantic Reasoning," Nat. Hazards Earth Syst. Sci., 15, 1087-1101; Copernicus Publications; 2015.

Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, The Netherlands, Apr. 2014.

Kang et al., "Building Instance Classification Using Street View Images," ISPRS Journal of Photogrammetry and Remote Sensing, 145, 44-59, Elsevier, Mar. 2018.

USPTO, Advisory Action regarding U.S. Appl. No. 15/634,879, dated Jan. 19, 2022.

Omniearth, Inc., Response to Jan. 19, 2022 Advisory Action and Sep. 14, 2021 Office Action regarding U.S. Appl. No. 15/634,879, filed Feb. 14, 2022.

USPTO, Notice of Allowance for U.S. Appl. No. 15/634,879, dated Mar. 17, 2022.

USPTO, Office Action regarding U.S. Appl. No. 17/072,627, dated Oct. 31, 2022.

Zhuo et al., "Optimization of OpenStreetMap Building Footprints Based on Semantic Information of Oblique UAV Images", Remote Sensing, vol. 10, No. 4, Apr. 18, 2018.

Shi et al., "Building Footprint Generation Using Improved Generative Adversarial Networks," ARXIV.org, Cornell University Library, 201 Olin Library Cornell University Ithaca, NY 14853; Oct. 26, 2018.

Pictometry International Corp., Response to Oct. 31, 2022 Office Action regarding U.S. Appl. No. 17/072,627, dated Jan. 31, 2023.

USPTO, Notice of Allowance regarding U.S. Appl. No. 17/072,627, dated Feb. 21, 2023.

Canadian Intellectual Property Office, Office Action regarding Canadian patent application No. 3,149,080, dated Mar. 3, 2023.

Pictometry International Corp., Response to Mar. 3, 2023 Office Action regarding Canadian patent application No. 3,149,080, dated Jun. 28, 2023.

Canadian Intellectual Property Office, Office Action regarding Canadian Patent Application No. 3,149,080, dated Jan. 12, 2024.

(56) References Cited

OTHER PUBLICATIONS

Pictometry Internaional Corp., Response to Jan. 12, 2024 Office Action regarding Canadian Patent Application No. 3,149,080, dated May 7, 2024.

* cited by examiner

ROOF CONDITION ASSESSMENT USING MACHINE LEARNING

CROSS-REFERENCE TO RELATED APPLICATIONS

The present patent application is a divisional application of U.S. patent application Ser. No. 16/893,090, filed Jun. 4, 2020, which claims priority to the provisional patent application identified by U.S. Ser. No. 62/903,469, titled "ROOF CONDITION ASSESSMENT USING MACHINE LEARNING," filed on Sep. 20, 2019, the entire contents of each of which are hereby expressly incorporated by reference herein. Further, the entire contents of the provisional patent application identified by U.S. Ser. No. 62/858,656, titled "SYSTEMS FOR DETECTION OF CHANGES IN EXTENT OF STRUCTURES," filed on Jun. 7, 2019, is hereby expressly incorporated by reference herein.

BACKGROUND

The assessment of a structure's roof often requires a person be sent to the site of the structure to inspect the roof. This can be a time consuming and expensive process. However, current automated processes for the assessment of roofs from digital images in the field of remote sensing also have drawbacks.

Digital images can be described as pixelated arrays of electronic signals. The array may include three dimensions. Such an array may include spatial (x, y or latitude, longitude) values and spectral (e.g., red, green, blue [RGB]) values. Each pixel in the image captures wavelengths of light incident on the pixel, limited by the spectral bandpass of the system. The wavelengths of light are converted into digital signals readable by a computer as float or integer values. How much signal exists per pixel depends, for example, on the lighting conditions (light reflection or scattering), what is being imaged, and even the imaged object's chemical properties.

Machine Learning (ML) is generally the scientific study of algorithms and statistical models that computer systems use in order to perform a specific task effectively without using explicit instructions, relying on patterns and inference instead. It is considered a subset of artificial intelligence (AI). Machine learning algorithms build a mathematical model based on sample data, known as "training data", in order to make predictions or decisions without being explicitly programmed to perform the task. Machine learning algorithms are used in a wide variety of applications, such as email filtering, computer vision, and digital imagery analysis, where it is infeasible to develop an algorithm of specific instructions for performing the task. Machine Learning algorithms are commonly in the form of an artificial neural network (ANN), also called a neural network (NN). A neural network "learns" to perform tasks by considering examples, generally without being programmed with any task-specific rules. The examples used to teach a neural network may be in the form of truth pairings comprising a test input object and a truth value that represents the true result from the test input object analysis. When a neural network has multiple layers between the input and the output layers, it may be referred to as a deep neural network (DNN).

For machine learning with digital imagery, the goal is to train a computer system to deconstruct digital images into clusters of aggregated pixels and statistically identify correlations in the clusters. The correlations are iteratively evaluated and "learned" from by the computer system, based on a directive to classify a set of patterns as a specific thing. For example, the directive could be to classify the set of patterns to distinguish between a cat and dog, identify all the cars, find the damage on the roof of a structure, and so on. The utilization of neural networks in machine learning is known as deep learning.

Over many imaged objects, regardless of color, orientation, or size of the object in the digital image, these specific patterns for the object are mostly consistent—in effect they describe the fundamental structure of the object of interest. For an example in which the object is a cat, the computer system comes to recognize a cat in an image because the system understands the variation in species, color, size, and orientation of cats after seeing many images or instances of cats. The learned statistical correlations are then applied to new data to extract the relevant objects of interest or information.

Convolutional neural networks (CNN) are machine learning models that have been used to perform this function through the interconnection of equations that aggregate the pixel digital numbers using specific combinations of connections of the equations and clustering the pixels, in order to statistically identify objects (or "classes") in a digital image. Exemplary uses of Convolutional Neural Networks are explained, for example, in "ImageNet Classification with Deep Convolutional Neural Networks," by Krizhevsky et al. (Advances in Neural Information Processing Systems 25, pages 1097-1105, 2012); and in "Fully Convolutional Networks for Semantic Segmentation," by Long et al. (IEEE Conference on Computer Vision and Pattern Recognition, June 2015.

Generative adversarial networks (GANs) are neural network deep learning architectures comprising two neural networks and pitting one against the other. One neural network, called a Generator, generates new data instances, while another neural network, called a Discriminator, evaluates the new data instances for authenticity, that is, the Discriminator decides whether each data instance belongs to the training data set or not. The creation of a generative adversarial network is explained, for example, in "Generative Adversarial Networks," by Goodfellow, et al (Departement d'informatique et de recherche operationnelle Universite de Montreal, June 2014).

When using computer-based supervised deep learning techniques, such as with a CNN, for digital images, a user provides a series of examples of digital images of the objects of interest to the computer and the computer system uses a network of equations to "learn" significant correlations for the object of interest via statistical iterations of pixel clustering, filtering, and convolving.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest. The relationships between the layers of the neural network, such as that described in the binary output, may be referred to as the neural network model or the machine learning model.

In the technological field of remote sensing, digital images may be used for mapping geospatial information. Classifying pixels in an image for geospatial information purposes has been done through various techniques. For example, some CNN-based techniques include Semantic Segmentation (also known as pixel-wise classification or individual pixel mapping) using fully convolutional neural networks (FCN) as described in "Fully Convolutional Networks for Semantic Segmentation," by Long et al., referenced above. In this technique, each pixel in the image is given a label or classification based on training data examples, as discussed in the general overview above. However, the technique is computationally intensive, as it requires resources of computational space, time, and money to assess each individual pixel.

A technique that exists outside of the technological field of geospatial mapping is General Image Classification using a convolutional neural network (CNN), such as that described by Simonyan et al. in the article "Very Deep Convolutional Networks for Large-Scale Image Recognition" (International Conference on Machine Learning, 2015). In General Image Classification, rather than individual pixels being labeled, an entire image is given a generalized label. This is typically a much simpler algorithm than the FCN Semantic Segmentation, and so may require less computation. However, this method provides less information about an image, as it is limited to the image as an aggregated whole as a generalization rather than identifying particulars, such as where objects in the scene are located within the digital image or where particular information is located within the digital image.

A manual process to determine a roof classification for a structure exists whereby an individual reviews each image of a structure and marks on the image roof characteristics, and the individual then determines the roof classification based on their review. This process, however, is slow and time consuming. Additionally, due to the need for the individual to review each of the images, it is very costly.

What is needed is a system to determine the roof classification for a structure from imagery in which the process is not as time consuming or as expensive as the manual process, but is more accurate and provides more information about the roof classification than general image observations. It is to such an improved system to determine the roof classification from imagery that the present disclosure is directed.

SUMMARY

The problem of determining the roof classification for a structure from imagery is solved with the systems described herein.

In one embodiment, the present disclosure describes a non-transitory computer readable medium storing computer executable code that when executed by a processor cause the processor to: receive a mask image of a structure, the structure having a roof with one or more characteristic, the mask image having pixels with first pixel values depicting the structure and second pixel values outside of the structure depicting a background; and, assess one or more characteristic of the roof based at least in part on the first pixel values with a machine learning algorithm and resulting in a classification of the one or more characteristic of the roof.

In some embodiments, assessing one or more characteristic of the roof based at least in part on the first pixel values includes the machine learning algorithm determining a probability that the roof depicted in the first pixel values for multiple roof classification categories, and combining the probabilities for the multiple roof classification categories into a composite probability indicative of the one or more characteristic of the roof.

The one or more characteristics include roof condition, roof architecture, roof material, roof tree coverage, or roof solar panel coverage. In some embodiments, the mask image has a pixel resolution between one to nine inches per pixel.

In some embodiments, the machine learning algorithm has been trained with truth pairs including a test masked image and a truth roof classification.

In some embodiments, the mask image is indicative of an entirety of the roof, and wherein the classification is indicative of an entirety of the roof.

In some embodiments, the present disclosure describes a non-transitory computer readable medium storing computer executable code that when executed by a processor cause the processor to: receive an image of a structure having an outline and a roof with one or more characteristic, the image having pixels with first pixel values depicting the structure and second pixel values outside of the structure depicting a background of a geographic area surrounding the structure, and image metadata including first geolocation data; generate a synthetic shape image of the structure from the image using a machine learning algorithm, the synthetic shape image including pixels having pixel values forming a synthetic shape of the outline, the synthetic shape image having second geolocation data derived from the first geolocation data; map the synthetic shape onto the image of the structure, based at least in part on the first and second geolocation data, and change the second pixel values of the image so as to not depict the background of the geographic area outside of the structure forming a mask image; and, assess one or more characteristic of the roof based at least in part on the first pixel values with a second machine learning algorithm and resulting in a plurality of probabilities, with each of the probabilities for a respective roof condition classification category, and determining a composite probability based upon the plurality of probabilities so as to classify the one or more characteristic of the roof.

In other embodiments, the present disclosure describes a non-transitory computer readable medium storing computer executable code that when executed by a processor cause the processor to: receive an image of a structure having an outline and a roof with one or more characteristic, the image having pixels with first pixel values depicting the structure; assess one or more characteristic of the roof based at least in part on the first pixel values with a machine learning algorithm and resulting in a plurality of probabilities, with each of the probabilities for a respective roof condition classification category, and determining a composite probability based upon the plurality of probabilities so as to classify the one or more characteristic of the roof.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
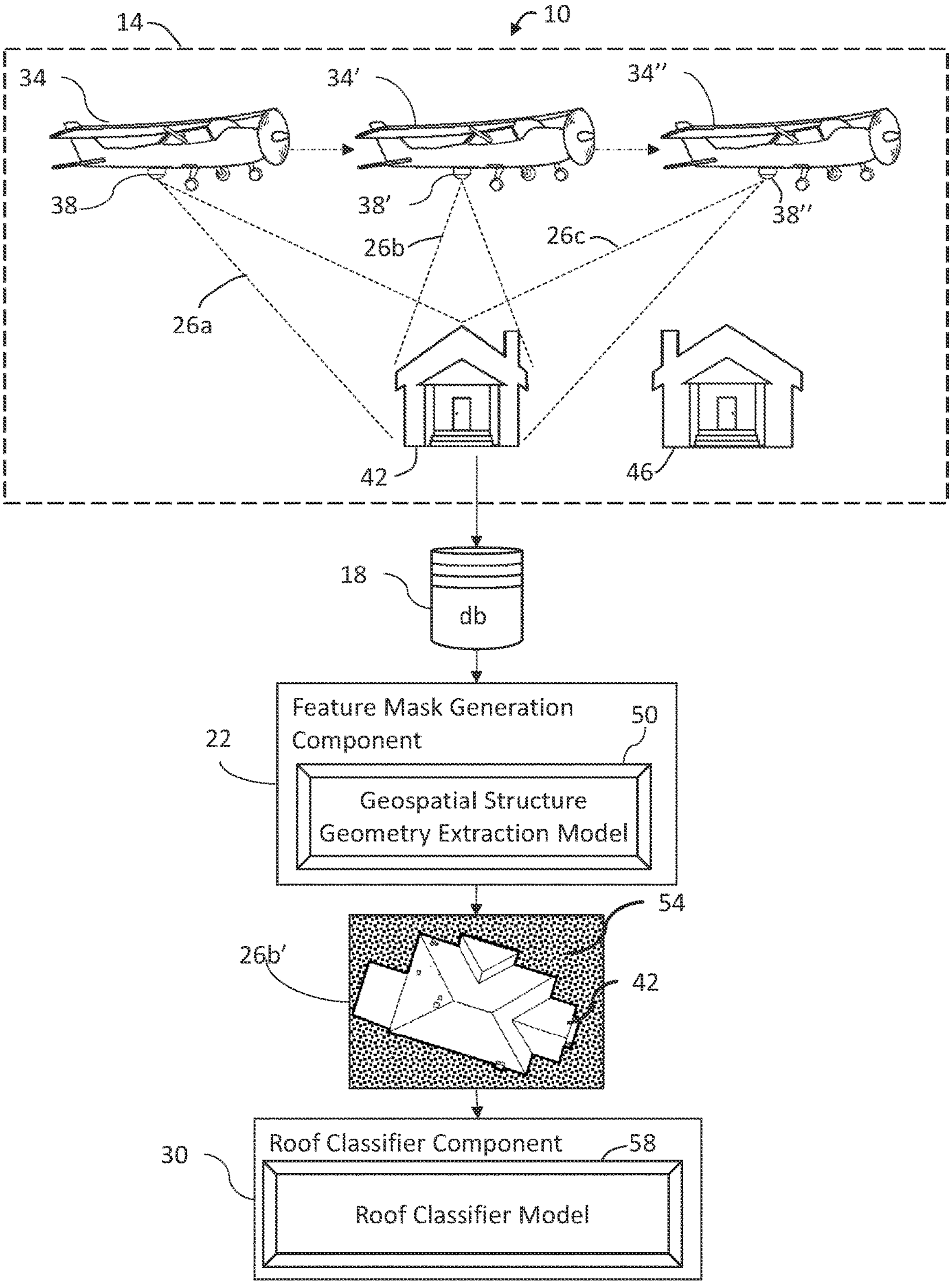
FIG. 1 is a diagram of an exemplary embodiment of a roof classification assessment system.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, the methods and systems may be used to assess an outline of an object in an image depicting the object. Although the object will be described herein with respect to a structure, such as a building, it should be understood that the object could be other types of objects, such as man-made objects, or natural objects. Non-exclusive examples of man-made objects include other types of buildings such as industrial buildings, or commercial buildings. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software, also known as computer executable code, may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like.

Determining the precise bounds of an object, such as a structure within imagery is a step in a multitude of processes dealing with structure analysis. From identifying new portions of the structure or classifying segments of a structure to isolating the structure within an image for further image analysis, quickly and precisely determining the bounds of the structure within an image ultimately affects the precision and accuracy of further measurements and analysis of the structure.

Structure geometry is defined as a structure's extent or the structure's shape. The structure geometry may include any porches, carports, utility areas, or garages that are attached to the structure. The structure geometry may also include any other structure or feature attached to the structure such as a gazebo or pergola.

A roof classification assessment can be used to determine characteristics of the roof of the structure and can provide a scale on which the roof is rated. For example, if the roof classification assessment were used to classify a roof's condition, the assessment may result in a probability of a roof condition being a good condition, a fair condition, a poor condition, a damaged condition, a catastrophic condition or a combination thereof. For example, the assessment may result in a first probability that the roof condition is a good condition, a second probability that the roof condition is a fair condition, a third probability that the roof condition is a poor condition, a fourth probability that the roof condition is a damaged condition, and a fifth probability that the roof condition is a catastrophic condition. The first through fifth probabilities can be combined so as to generate a composite probability that is more granular and definite of the roof's architecture than any of the individual classifications.

In another embodiment, the roof classification assessment is used to classify a roof's architecture, which may result in the assessment being a probability of a roof architecture being a gabled architecture, a hip architecture, a flat architecture, a mix architecture, or combinations thereof. For example, the assessment may result in a first probability that the roof architecture is a gabled architecture, a second probability that the roof condition is a hip architecture, a third probability that the roof condition is a flat architecture, and a fourth probability that the roof architecture is a mix architecture. The probabilities can be combined so as to generate a composite probability that is more granular and definite of the roof's architecture than any of the individual classifications.

In another embodiment, the roof classification assessment is used to classify a roof's material, which may result in the assessment being a probability of a roof material being a shingle material, a tile material, a metal material, a poly material, an asphalt material, a ballasted material or combinations thereof.

In another embodiment, the roof classification assessment is used to classify a roof's tree coverage, which may result in the assessment being a probability of a roof tree coverage being no tree coverage, low tree coverage, medium tree coverage, high tree coverage or combinations thereof.

In yet another embodiment, the roof classification assessment may be used to classify a roof's solar panel coverage, which may result in the assessment being a probability of solar panel coverage being no solar panel coverage, low solar panel coverage, medium solar panel coverage, high solar panel coverage or combinations thereof. Alternatively, the assessment may be a determination of where there are any solar panels present, or, in another embodiment, a determination of a percent of solar panel roof coverage, i.e., solar panels cover 30% of the structure's roof.

Described below are examples of a fully automated machine learning solution for assessing the roof classification of a structure, in a quantifiable manner.

Referring now to the drawings, FIG. 1 is a diagram of an exemplary embodiment of a roof classification assessment system 10. The roof classification assessment system 10 comprises an image capture component 14, one or more image database 18, a feature mask generation component 22 receiving an image from the image database 18 to generate at least one mask image 26*b*', and a roof classifier component 30 to assess a roof classification of a structure depicted in the mask image 26*b*'. In one embodiment, the image capture component 14 and the feature mask generation component 22 operate substantially simultaneously, while in another embodiment, the image capture component 14 operates prior to and/or independent of the feature mask generation component 22.

In one embodiment, the image capture component 14 comprises at least one capture platform 34 at a first position having at least one camera 38 capturing an image 26*a* of a structure 42 at a first instance in time as shown in FIG. 1. The capture platform 34' is the capture platform 34 at a second position having the at least one camera 38' capturing an image 26*b* of the structure 42 at a second instance in time. The capture platform 34" is the capture platform 34 at a third position having the at least one camera 38" capturing an image 26*c* of the structure 42 at a third instance in time. The image 26*a* and the image 26*c* are both oblique images of the structure 42 and the image 26*b* is an orthogonal image of the structure 42. It is understood that the capture platform 34 may take images of more than one structure at one time. For instance, the capture platform 34' at the second instance in time may take the image 26*b* of structure 42 while also taking a first oblique image of a second structure 46. One or more of the image 26*a*, the image 26*b*, and the image 26*c*, may be referred to in the singular as image 26 or in the plural as images 26 for clarity. The captured images 26 comprise a plurality of pixels.

Captured images 26 are then stored in the image database 18. For purposes of the examples described herein, images 26 depicting the structure 42 will be described. It should be understood, however, that the images 26 may show many structures of various types, shapes, and geometries, each of which may be analyzed to generate the mask image 26*b*' as discussed herein.

In one embodiment, the capture platform 34 comprises a manned aircraft, however, in other embodiments, the capture platform 34 comprises an unmanned aircraft, such as a drone remotely controlled by a pilot or an autonomous drone that is self-piloting. In some embodiments, the capture platform 34 may also comprise one or more vehicle, either manned or unmanned, aerial based or ground based. Exemplary vehicles include an airplane, a helicopter, a drone, a car, a boat, or a satellite. In some embodiments, the capture platform 34 may be carried by a person. For example, the capture platform 34 can be implemented as a cellular telephone or as a digital camera.

In one embodiment, the at least one camera 38 can be oriented and located in various orientations and locations, such as street view, satellite, automotive based, unmanned aerial vehicle based, and/or manned aerial vehicle based. The image data may contain nominal "visible-band" (e.g., red, green, blue) wavelength spectral data or other spectral bands data (for example, infrared wavelength spectral data). The images 26 can be captured independently at different instances of time, or at least some of the images 26 can be captured simultaneously using multiple cameras. The images 26 can be captured through the use of a global shutter in which all of the sensors within the camera are exposed simultaneously, a rolling shutter in which different scanlines in the sensor are exposed at different times, or combinations thereof. In one embodiment, one or more of the images 26 can be a synthetic global shutter image created from a rolling shutter image, or combinations thereof. An exemplary synthetic global shutter image is disclosed in the patent application identified by PCT/AU2017/051143 (published as WO2018/071983) and in the patent application identified by U.S. Ser. No. 16/343,610, filed Apr. 19, 2019 (published as US 2020/0059601 A1), the contents of each of which are hereby expressly incorporated herein by reference.

In one embodiment, the images 26 have or are correlated with geolocation data indicating the location, orientation, and camera parameters of a camera at the precise moment each image 26 is captured. The geolocation data can be stored as metadata. Exemplary metadata includes X, Y and Z information (e.g., latitude, longitude and altitude); time; orientation such as pitch, roll, and yaw; camera parameters such as focal length and sensor size; and correction factors such as error due to calibrated focal length, sensor size, radial distortion, principal point offset, and alignment. The images 26 may be geo-referenced, that is processed such that pixels in the image 26 have a determined geo-location, such as X, Y, and Z coordinates and/or latitude, longitude, and elevation/altitude coordinates. The determined geo-location, such as X, Y, and Z coordinates and/or latitude, longitude, and elevation/altitude coordinates may be included within the metadata. See, for example, U.S. Pat. No. 7,424,133 that describes techniques for geolocating oblique images and measuring within the oblique images 26, also see, for example, WO2018071983, titled "An Image Synthesis System," the entire contents of each of which are hereby incorporated herein by reference. The metadata can be stored within the images 26 or stored separately from the images 26 and related to the images 26 using any suitable technique, such as unique identifiers.

In one embodiment, each of the images 26 may have a unique image identifier such as by use of metadata, or otherwise stored in such a way that allows a computer system to definitively identify each of the images 26.

Figure 2A:
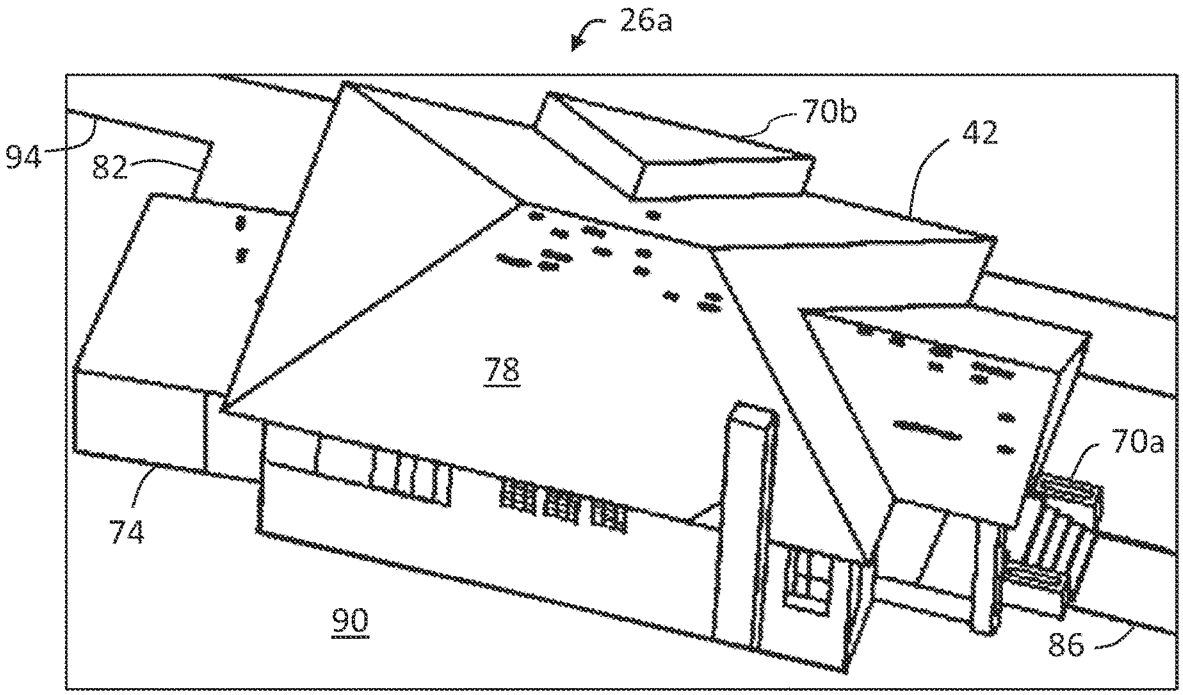
FIG. 2A is an exemplary oblique image depicting a structure.
Figure 2B:
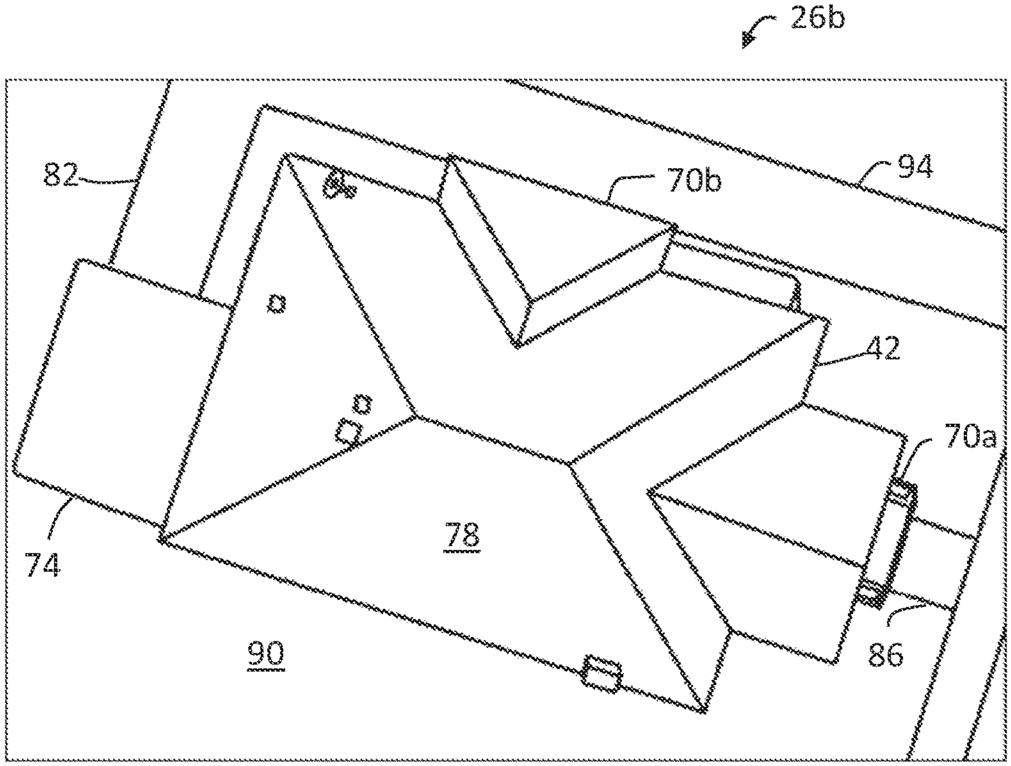
FIG. 2B is an exemplary nadir image depicting the structure of FIG. 2A.

In the example shown in FIGS. 2A and 2B, the images 26*a*, 26*b*, and 26*c* of the structure 42 are from an aerial perspective. In some embodiments, each of the pixels within the images 26*a*, 26*b*, and 26*c* are within a range of approximately 0.1 inch to approximately 14 inches of ground coverage. Exemplary images 26*a*, 26*b*, and 26*c* may have a pixel resolution sufficiently large so as to be unable to identify hail damage. For example, the pixel resolution of the images 26*a*, 26*b*, and 26*c* may be within a range of approximately 2 inches to approximately 10 inches.

An aerial oblique view may be taken from approximately 10 degrees to 75 degrees from a nadir direction. The image 26*a* is from an oblique perspective which is typically within a range from about 10 degrees to 75 degrees from a nadir perspective, and more preferably within a range from about 40 degrees to 50 degrees from the nadir perspective. The image 26*b* is captured from an overhead viewpoint, also referred to as an ortho view or nadir view, typically taken directly below and/or vertically downward from the camera lens positioned above the structure 42. In one embodiment, certain of the images 26 may be nadir, and some of the images 26 may be captured from an oblique perspective. In some embodiments, some of the images 26 can be captured from different oblique angles. For example, a first one of the images 26 may be an aerial nadir image, a second one of the images 26 may be an aerial oblique image taken from approximately 10 degrees from the nadir direction, and a third one of the images 26 may be an aerial oblique image taken from approximately 20 degrees from the nadir direction.

Exemplary image capture components that can be used to capture the images 26 are disclosed in U.S. Pat. Nos. 7,424,133, 8,385,672, and U.S. Patent Application 2017/0244880, the entire contents of each of which are hereby expressly incorporated herein by reference.

In one embodiment, the structure 42 is selected for analysis. The selection of the structure 42 may be performed by a user or by one or more computer processor 254. The selection of the structure 42 by the processor 254 may be performed in a stand-alone operation or may be performed by the processor 254 accessing a database of structures lacking roof classification information and selecting the structure 42 from the database to process. In one embodiment, the structure 42 is a dwelling, or house, while in other embodiments, the structure 42 is a commercial building. In other embodiments, the structure 42 is a detached garage, an ancillary residential or commercial structure, or other structure with a roof. Selection of the structure 42 can be indirect, such as when a particular geographic region is selected. When a particular geographic region is selected, then the processes described herein can be applied to each of the structures 42 and/or each of the second structures 46 depicted within images 26 showing at least a portion of the geographic region. Locations of particular structures 42 depicted within the images 26 can be determined using a geo-coding database.

In one embodiment the image database 18 is integrated with the feature mask generation component 22. However, the image database 18 may also be integrated into the image capture component 14 or may be separate from both the image capture component 14 and the feature mask generation component 22. In another embodiment, the image capture component 14, the image database 18, and the feature mask generation component 22 are integrated with each other and/or are integrated within the roof classification assessment system 10.

The feature mask generation component 22 receives or selects the image 26 of the structure 42 in the image database 18. When multiple structures (such as the structure 42 and the second structure 46 and/or additional structures) are depicted in the image 26, a region within the image 26 depicting the structure 42 may be selected and then subsequently analyzed as discussed below. The feature mask generation component 22 then analyzes the image 26 to extract geospatial structure geometry for the structure 42 forming a synthetic shape that is used to generate the mask image 26*b*'. In one embodiment, the feature mask generation component 22 utilizes machine learning, such as a geospatial structure geometry extraction model 50 to extract precise geospatial structure geometry for the structure 42 used to form the synthetic shape. An exemplary embodiment of initializing the geospatial structure geometry extraction model 50 is show in FIG. 3 and described in more detail below.

The mask image 26*b*' depicts the structure 42 and a mask image background 54. In some embodiments the mask image 26*b*' shows only real world captured pixels of the structure 42 even though other structures may have been shown in the image 26 used to generate the mask image 26*b*'. In this embodiment, the pixel values in the mask image background 54 are changed to predetermined or varying pixel value(s) that do not represent the real world captured pixels of the background surrounding the structure 42 in the image 26. By showing only real world captured pixels of the structure 42 in the mask image 26*b*', the roof of the structure 42 is visually isolated from the remainder of the image 26*b*.

The roof classifier component 30 analyzes the mask image 26*b*' to classify characteristics of the roof of the structure 42. In one embodiment, the roof classifier component 30 utilizes machine learning, such as a convoluted neural network having a roof classifier model 58 (illustrated in FIG. 8 and discussed in detail below), to classify the roof of the structure 42. The roof classifier component 30 classifies characteristics of the roof of the structure 42 based on which one or more characteristics the roof classifier model

58 has been trained to classify. Characteristics of the roof of the structure 42 may include roof condition, roof architecture, roof material, roof tree coverage, and/or roof solar panel coverage. While only one roof classifier component 30 is shown in FIG. 1, the mask image 26*b*' may be analyzed by more than one roof classifier component 30, either sequentially or simultaneously. For instance, the mask image 26*b*' may be analyzed by a roof condition classifier component to determine the condition of the roof and by a roof architecture classifier component to determine the architecture of the roof, thereby providing compound classifications including both the roof condition and the roof architecture, for instance classifying a roof as a "fair condition," "gabled architecture" roof. In another embodiment, more than one characteristic is combined into a combined roof classifier component 30. For instance, the combined roof classifier component 30 may classify both the material and tree coverage of the roof of the structure 42 and provide a compound classification, such as classifying a roof as a "shingle material" roof with "low" tree coverage.

Referring now to FIG. 2A, shown therein is an exemplary embodiment of the image 26*a* depicting the structure 42 from an oblique perspective having a first porch 70*a*, a second porch 70*b*, a garage 74, and the roof 78. The image 26*a* also depicts a background of the structure 42 including a driveway 82, sidewalk 86, a lawn 90, and a road 94.

While only identifiable structure features including the first porch 70*a*, the second porch 70*b*, the garage 74, the roof 78, and the driveway 82 are shown in image 26*a*, it is understood that other structures may have further identifiable features such as, but not limited to, a pergola, a deck, and that other objects in addition to the structure 42 may be depicted in the image 26*a*. Further, other background including a pool, vegetation, a pond, or other natural features may also be depicted in the image 26*a*.

Referring now to FIG. 2B, shown therein is an exemplary embodiment of the image 26*b* depicting the structure 42 from an orthogonal, or nadir, perspective. The image 26*b* also depicts the structure 42 having the first porch 70*a*, the second porch 70*b*, the garage 74, and the roof 78. The background including the driveway 82, the sidewalk 86, the lawn 90, and the road 94 are also shown.

Other objects may also be depicted as background in the images 26*a* and 26*b* such as vegetation, including but not limited to shrubbery, tall grass, trees, bushes, and flowers, geographic features, including but not limited to hills, cliffs, ponds, lakes, ponds, and rivers, and other human-made structures, including but not limited to other houses, sheds, pools, gardens, driveways, roads, bridges, sidewalks, and towers. It is understood that the drawings are limited to two images 26*a* and 26*b* of the structure 42 for simplicity, however, the number of images 26 of the structure 42 may exceed two.

In one embodiment, the images 26*a* and the image 26*b* are shown as aerial images by way of example. It should be understood that image 26*a* and image 26*b* may be captured in other manners. Additionally, image 26*a* and image 26*b* may be captured at different times.

Figure 3:
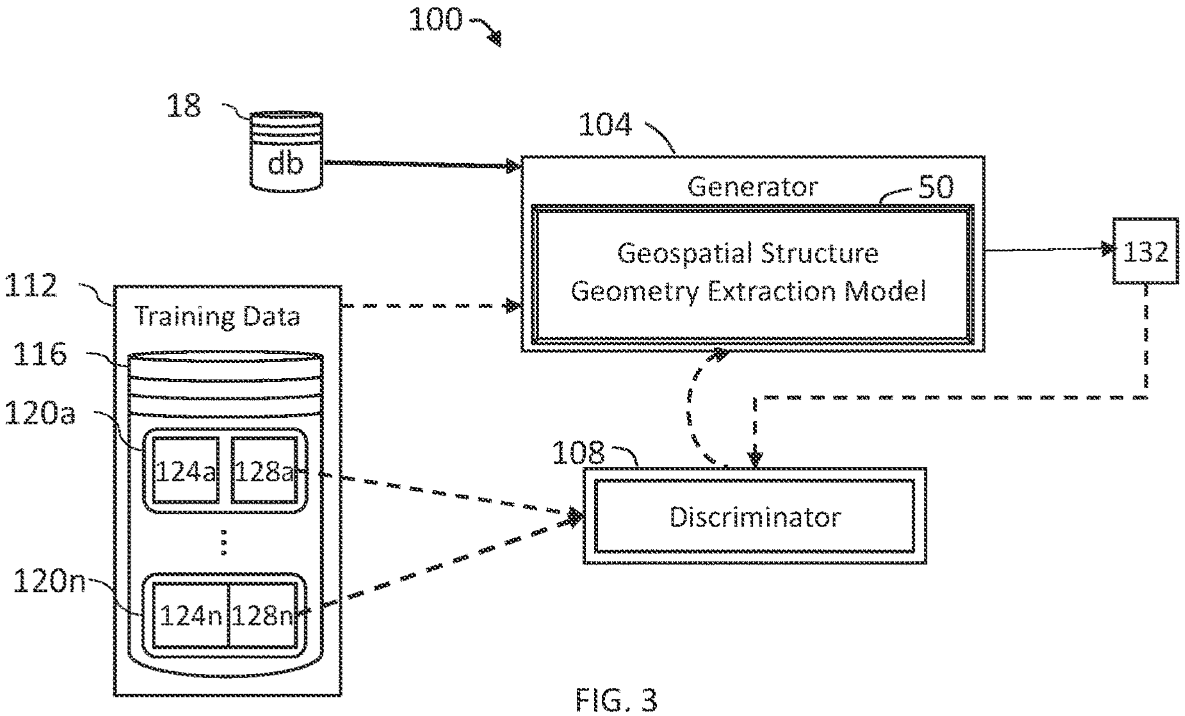
FIG. 3 is an exemplary embodiment of a generative adversarial network constructed in accordance with the present disclosure.

Referring now to FIG. 3, the feature mask generation component 22 may include a generative adversarial network 100 having a generator 104 and a discriminator 108. The generative adversarial network 100 is trained to analyze the images 26 and map a precise extent of one or more structures shown in the images 26, such as particular structures, e.g., the structure 42. These structures may then be mapped in vector format, back to the ground and used either alone as object masks and feature sets, or in combination with additional data sources for further analysis.

The presently disclosed method may train the generative adversarial network 100 with training data 112 stored in a training database 116. The training data 112 includes a plurality of truth pairs 120*a-n*. Each of the truth pairs 120 includes a truth image 124 (which may be an RGB image) and a truth shape image 128 (which may also be an RGB image). Each of the truth pairs 120 are matched, that is, the truth image 124*a* corresponds with the truth shape image 128*a*, and the truth image 124*n* corresponds with the truth shape image 128*n*.

When the generative adversarial network 100 is trained to identify an object outline, the truth shape image 128 will include an outline of an object within the truth image 124. For example, when the generative adversarial network 100 is trained to generate structure outlines, the truth shape image 128 may include a structure outline 128 as discussed below.

The truth image 124 and the truth shape image 128 may have the same pixel resolution such that the pixels within the truth image 124 and the truth shape image 128 cover the same amount of area on the ground. In some embodiments, each of the pixels within the truth image 124 are within a range of approximately 0.1 inch to approximately 14 inches of ground coverage. Exemplary images may have a pixel resolution of approximately 2 inches to approximately 10 inches. In some embodiments, each of the pixels within the truth shape image 128 are within a range of approximately 0.1 inch to approximately 14 inches of ground coverage. Exemplary images may have a pixel resolution within a range of approximately 4 inches to approximately 10 inches.

Further, in some embodiments, the truth image 124 and the truth shape image 128 may include metadata derived from the truth image 124, such as X, Y and Z location information (e.g., latitude, longitude, and altitude); time; orientation such as pitch, roll, and yaw; camera parameters such as focal length and sensor size; and correction factors such as error due to calibrated focal length, sensor size, radial distortion, principal point offset, and alignment. In one embodiment, the metadata used to geo-reference the truth image 124 is the same as metadata used to geo-reference the truth shape image 128.

The generator 104 may include the geospatial structure geometry extraction model 50. The generator 104 is in communication with the image database 18, and the discriminator 108. Once trained, the geospatial structure geometry extraction model 50 processes images 26 stored within the image database 18 individually to generate a synthetic shape image 132 for at least one object within individual images 26. In one embodiment, the synthetic shape image 132 is then applied to the particular image 26 processed by the feature mask generation component 22 to generate the mask image 26*b*' illustrated in FIG. 7.

In some embodiments, the synthetic shape image 132 has metadata derived from the individual image 26 used to derive the synthetic shape image 132. For example, the image 26*b* shown in FIG. 2B is used to derive the example of the synthetic shape image 132 shown in FIG. 5. In this example, the synthetic shape image 132 may have a same pixel resolution as the image 26*b*. Further, the synthetic shape image 132 may have metadata, such as X, Y and Z location information (e.g., latitude, longitude and altitude); time; orientation such as pitch, roll, and yaw; camera parameters such as focal length and sensor size; and correction factors such as error due to calibrated focal length, sensor size, radial distortion, principal point offset, and alignment that is similar to or the same as the metadata for the image 26*b*.

Figure 4:
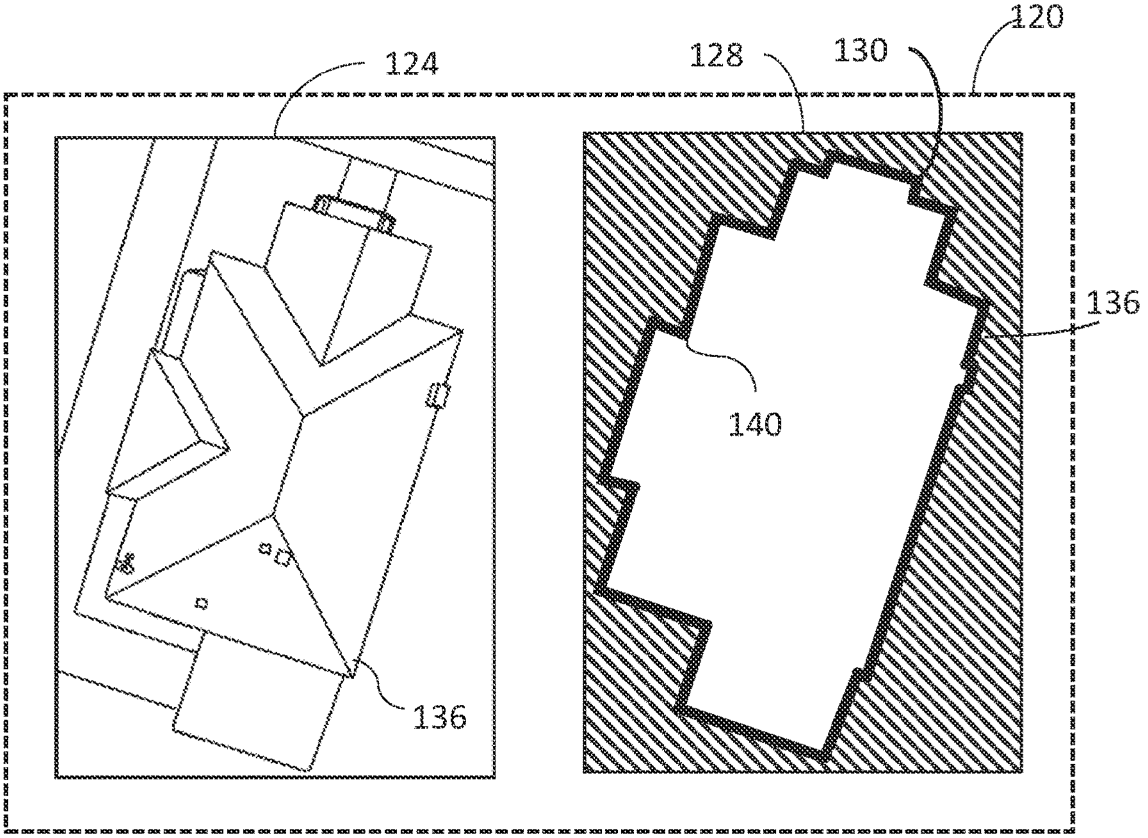
FIG. 4 is an exemplary embodiment of a truth pair used to train the generative adversarial network of FIG. 3.

The geospatial structure geometry extraction model 50 is a machine learning model that has been trained using the training data 112. The training data 112, an exemplary embodiment of which is shown in FIG. 4, includes a plurality of truth pairs 120*a-n* having the truth image 124 and the truth shape image 128 and may be stored in the training database 116. The truth pairs 120 include images of a variety of objects, such as buildings.

The truth images 124 may be ortho images, oblique images, or combinations thereof. The objects may include any type of man-made structure or building. Additionally, each of the one or more truth images 124 may be taken from a ground or an aerial perspective, or in some cases, may be taken from a satellite perspective. The truth image 124 includes pixels depicting an object, such as a structure 136.

For the truth image 124*a-n* of each truth pair 120*a-n*, the truth shape image 128*a-n* has been determined. The truth shape image 128*a-n* includes a truth shape 130, which may be an outline 140. The truth shape 130 may be a true and accurate outline 140 for the object(s) depicted within the truth images 124*a-n*. Defining the truth shape 130 within the truth shape images 128*a-n* may be done manually by an operator using an operator computer having image processing software. In this example, the operator may view the truth image 124 on a monitor, for example, and then add labels indicative of the truth shape 130 of an object (e.g., building) depicted within the truth image 124.

The labels indicative of the truth shape 130, e.g., outline 140, can then be processed to form the truth shape image 128. The truth shape image 128 may be a binary image having pixel values within the truth shape 130 having a first value, and pixel values outside of the truth shape 130 having a second value. The truth shape image 128 may have a pixel resolution equal to the truth image 124, as discussed above. In other embodiments, the truth shape image 94 has a different pixel resolution from the truth image 124, however, the truth shape image 128 may be able to map to the same resolution and/or metadata as the truth image 124, including the geo-referenced metadata such as longitude, latitude, and/or altitude.

The truth pairs 120*a-n* may be used to train a neural network, such as the generative adversarial network 100, to generate the synthetic shape 150 (shown in FIG. 5 and described below). In order to train the generative adversarial network 100, the truth pairs 120*a-n* are provided to both the generator 104 and the discriminator 108. The generator 104 is trained by sequentially receiving the truth images 124*a*-124*n*. In particular, for the first image pair 120*a*, the generator 104 receives the truth image 124*a* and generates the synthetic shape image 132. The synthetic shape image 132 includes a synthetic shape 150. The discriminator 108 receives the synthetic shape image 132 and then compares the synthetic shape 150 against the truth shape 130 of the truth shape image 128*a* which results in a probability of the synthetic shape 150 being the same as the truth shape 130 within a certain confidence amount for the first image pair 120*a*. The discriminator 108 then provides feedback to the generator 104 in an attempt to minimize any differences between the synthetic shape 150 and the truth shape 130 for the first image pair 120*a*.

If the synthetic shape 150 is outside of the confidence amount, the generator 104 produces another synthetic shape image 132 having the synthetic shape 150 and passes the synthetic shape image 132 to the discriminator 108, and this process continues until the generator 104 produces the synthetic shape image 132 having the synthetic shape 150 to which the discriminator 108 rates as a sufficient probability of the synthetic shape 150 being the truth shape 130. Then, the generator 104 and the discriminator 108 are provided with another truth pair 120, such as a truth pair 120*b*.

This process preferably continues until the generator 104 and the discriminator 108 are trained with all of the truth pairs 120*a-n* within the training database 116. At this point, the generator 104 is considered to be trained and the neural net model is set as the geospatial structure geometry extraction model 50. In this way, once the geospatial structure geometry extraction model 50 is trained and learns how to independently infer realistic synthetic shapes of objects not contained within the training data 112, the output of the geospatial structure geometry extraction model 50 results in a synthetic shape image 132 having the synthetic shape 150 in vector format that is geo-registered and mapped to the ground, that is the pixels within the synthetic shape image 132 are mapped to geospatial coordinates, yet is wholly unique but statistically consistent with the training data 112. In one embodiment, the synthetic shape 150 may be a series of edges and nodes defining a wireframe outline of the structure 42, for example, while in other embodiments, the synthetic shape 150 is a region within the synthetic shape image 132 having an outer boundary corresponding to a size and shape of the outline 140 of the structure 42.

As discussed above, the truth pairs 120*a-n* are used to train a neural network, such as the generative adversarial network 100, to generate the synthetic shape image 132 having at least the synthetic shape 150 (shown in FIG. 5 and described below). The generative adversarial network 100 comprises two neural networks, each having a neural net model, the generator 104 and the discriminator 108. The generator 104 receives an image and generates a synthetic shape image 132 having at least the synthetic shape 150. The discriminator 108, as a binary classifier, receives an input image and determines a probability that the input image is a "real" image, where the real image is a true and accurate truth image having a truth shape. During the training process, the generator 104 and the discriminator 108 may be trained in alternating steps.

A first step may be passing a first truth shape image 128*a* as the input image to the discriminator 108, which then determines the probability that the truth shape image 128*a* is a real truth shape image. Because it is known that the truth shape image 128*a* is a truth shape image, the probability determined by a perfectly trained neural network should approach 1.0. Backpropagation is used to train the discriminator 108 such that the probability that the truth shape image 128*a* is a real truth shape image more closely approaches 1.0.

A second step may be passing a truth image 124*a* to the generator 104, which then generates the synthetic shape image 132. The synthetic shape image 132 is then passed as the input image to the discriminator 108, which determines the probability that the synthetic shape image 132 is a real truth shape image. Because an ideal generator will generate a synthetic image that the discriminator 108 determines is most probably a real truth shape image, the probability that the synthetic shape image 132 is a real truth shape image is used in backpropagation to the generator 104, thereby teaching the generator 104 how to improve the synthetic shape image 132 such that the synthetic shape image 132 is determined to be a real truth shape image by the discriminator 108. Through backpropagation to the generator 104, the difference between the synthetic shape image 132 and the truth shape image 128*a* is minimized, thereby minimizing the difference between the synthetic shape 150 within the synthetic shape image 132 and the truth shape 130 within the truth shape image 128.

The training process of alternating the steps of training the discriminator 108 and training the generator 104 continues until the neural net model reaches a Nash equilibrium, or a convergence, that is, until the output of the generator 104 is no longer affected by backpropagation from the discriminator 108. In one embodiment, the generator 104 and/or the discriminator 108 may repeat the first step and/or the second step one or more times before proceeding to the subsequent step.

Once the neural net model converges, the generator 104 is considered to be trained and the neural net model of the generator 104 is set as the geospatial structure geometry extraction model 50. In this way, once the training process is complete, the geospatial structure geometry extraction model 50 has learned how to independently infer realistic synthetic shapes of objects not contained within the training data 112 that are wholly unique but statistically consistent with the training data 112. The output of the geospatial structure geometry extraction model 50 results in a synthetic shape image 132 having the synthetic shape 150 in vector format that is geo-registered and mapped to the ground, that is, the pixels within the synthetic shape image 132 are mapped to geospatial coordinates. In one embodiment, the synthetic shape 150 may be a series of edges and nodes defining a wireframe outline of the structure 42, for example, while in other embodiments, the synthetic shape 150 is a region within the synthetic shape image 132 having an outer boundary corresponding to a size and shape of the outline 140 of the structure 42.

In one embodiment, the truth shape images 128*a-n* of the training data 112 have metadata that is not present in or is adjusted from the metadata in the truth images 124*a-n*. Such metadata may include labels describing material type, condition, architectural elements, texture, color, or the like. During the training process, the generative adversarial network 100 may further learn to generate metadata for the synthetic shape image 132. For instance, the generator 104 may learn to generate a synthetic texture label for the synthetic shape image 132 from training data 112 having a truth texture label within the metadata for the truth shape image 128.

Figure 5:
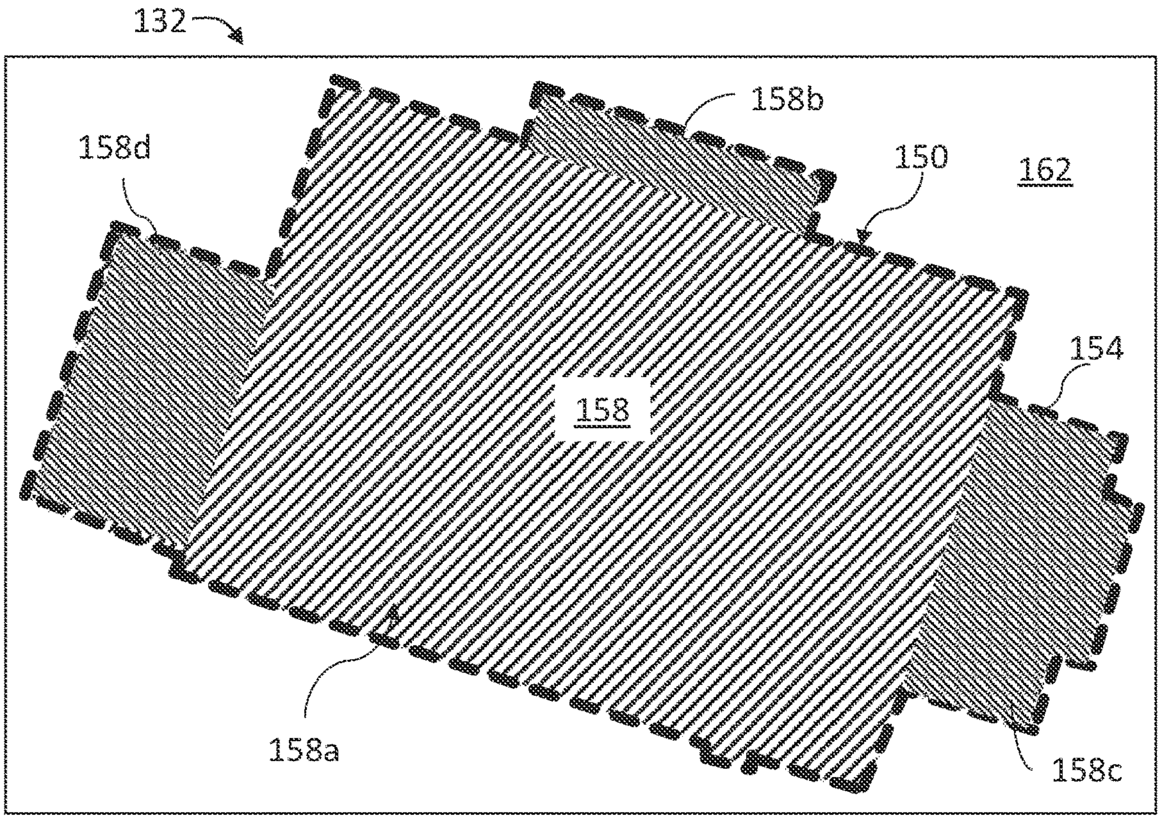
FIG. 5 is an exemplary embodiment of a synthetic structure of the structure of FIGS. 2A and 2B.

Referring now to FIG. 5, shown therein is an exemplary embodiment of the synthetic shape image 132 having the synthetic shape 150 formed by the geospatial structure geometry extraction model 50. The synthetic shape image 132 is comprised of at least two components including a synthetic shape outline 154 bordering a synthetic shape area 158. The synthetic shape image 132 may also have a filler area 162 surrounding the synthetic shape area 158. The filler area 162 may be comprised of pixels having a common value or may be composed of pixels having randomized values. The synthetic shape outline 154 corresponds to an outline of the structure 42 in the image 38*b*. The synthetic shape outline 154 may include structure 42 features such as the porches 70*a*, 70*b* and/or the garage 74, however, in other embodiments, the synthetic shape outline 154 does not include structure 42 features such as the porches 70*a*, and/or the garage 74. The synthetic shape area 158 is the area of one or more geometric figures defined by the synthetic shape outline 154. In one embodiment, the synthetic shape area 158 includes the extent of structure 42 features such as the porches 70*a*, 70*b* and/or the garage 74, while in another embodiment, the synthetic shape area 158 does not include such feature extents.

As shown in FIG. 5, where the synthetic shape area 158 includes structure 42 features, such features may be further identified by varied shading as indicated by a featureless shape area 158*a*—that is the synthetic shape area 158 less the synthetic areas of structure 42 features, e.g., a synthetic first porch area 158*b* corresponding to the second porch 70*b*, a synthetic second porch area 158*c* corresponding to the first porch 70*a*, and a synthetic garage area 158*d* corresponding to the garage 74.

Figure 6:
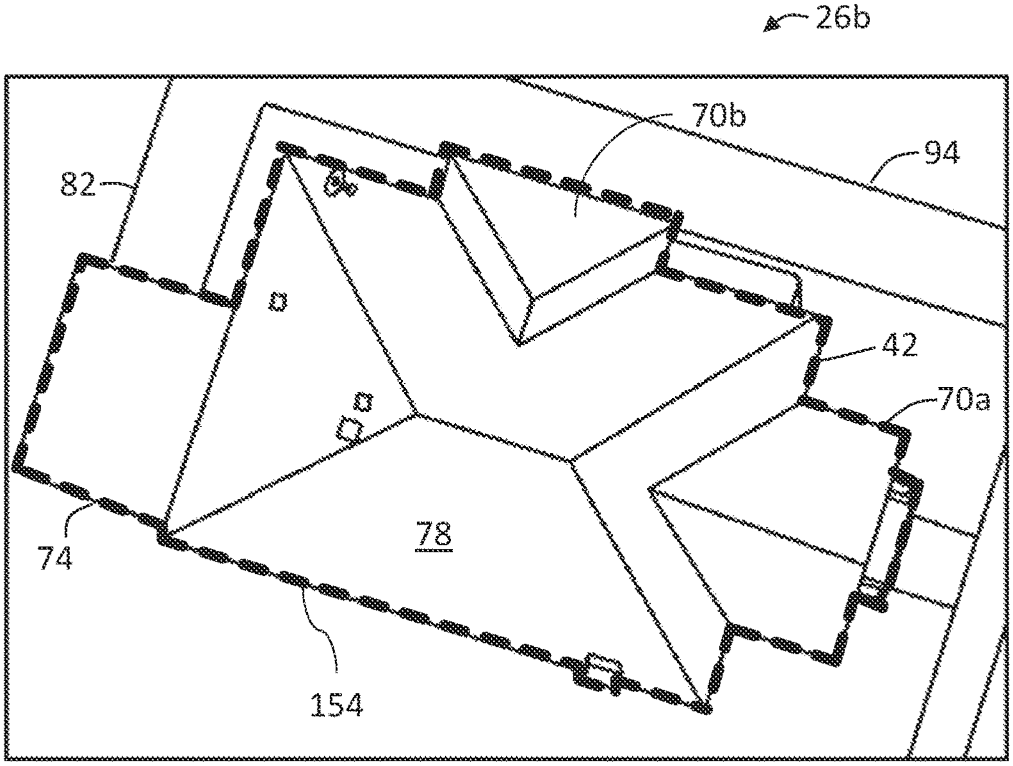
FIG. 6 is an exemplary depiction of the synthetic shape outline of FIG. 5 overlaid on the image of FIG. 2B.

Referring now to FIG. 6, shown therein is an exemplary embodiment of the image 26*b* having the synthetic shape outline 154 aligned over the structure 42. Also shown are the first porch 70*a*, the second porch 70*b*, the garage 74, the roof 78 within the synthetic shape outline 154. Background features, such as the driveway 82 and the road 94 within the image 26*b* are outside of the synthetic shape outline 154 and can be masked out of the image 26*b*. The synthetic shape outline 154 is mapped back onto the image 26*b*. Mapping the synthetic shape outline 154 onto the image 26*b* may be performed by aligning the image 26*b* and the synthetic shape outline 154 based on geolocation data stored and associated with both the image 26*b* and the synthetic shape outline 154. The driveway 82 and the road 94 are not included within the synthetic shape and, therefore, the synthetic shape outline 154 does not extend to surround the driveway 82 or the road 94.

Figure 7:
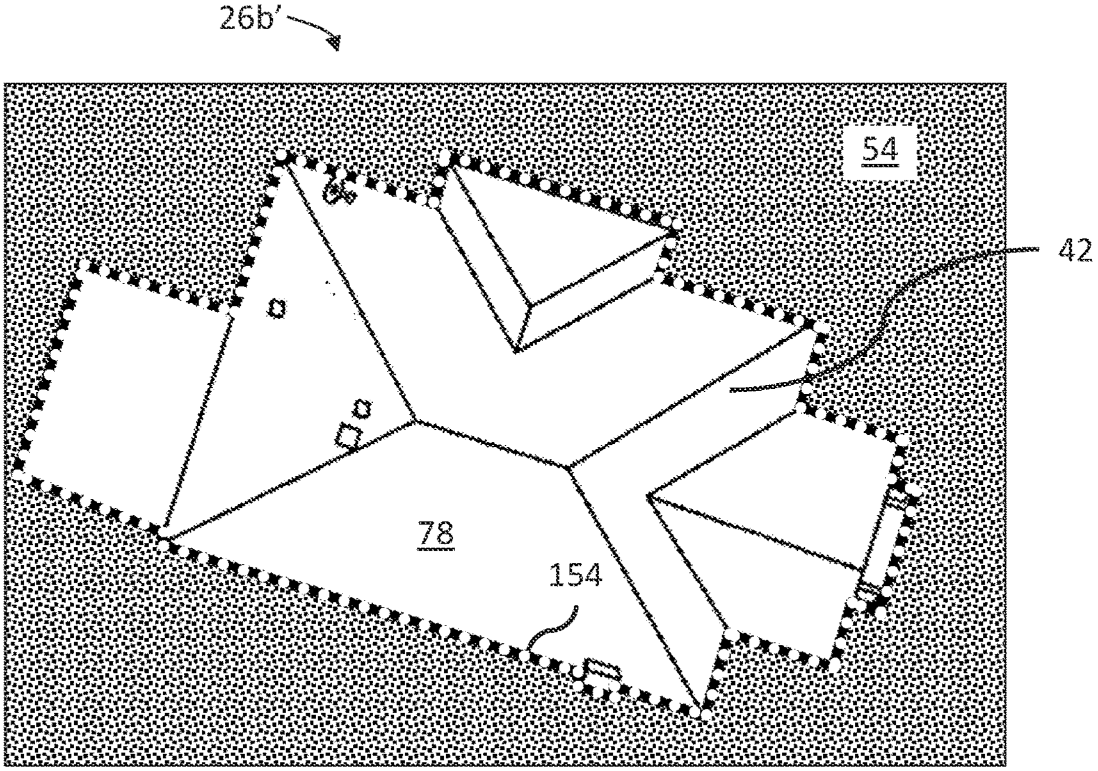
FIG. 7 is an exemplary embodiment of a mask image of FIG. 2B.

Referring now to FIG. 7, shown therein is an exemplary embodiment of the mask image 26*b*' wherein the synthetic shape outline 154 is applied as a feature mask thereby isolating the pixels depicting the structure 42 within the image 26*b*. In creating the mask image 26*b*', the structure 42 in image 26*b* is decoupled from an image background, the image background being all pixels of the image 26*b* outside the synthetic shape outline 154 shown in FIG. 6. The mask image background 54 is determined by altering all pixels of the image background from the original pixel values of the image 26*b* to random or predetermined pixel values other than the original pixel values and maintaining the values of all pixels within the synthetic shape outline 154, thereby forming the mask image 26*b*' having the structure 42 as the only identifiable object from the image 26*b*. By utilizing the mask image 26*b*' for analyzing the structure 42, extraneous scene details are reduced, resulting in more optimal feature extraction and assessment of the structure 42 directly.

In one embodiment, when it is desired to form a featureless mask image showing only a featureless portion of the structure 42, a featureless shape outline may be formed around the featureless shape area 158*a*, aligned and mapped onto the image 26*b*, and applied as a feature mask on image 26*b* thereby isolating the portion of the structure 42 corresponding to the featureless shape area 158*a* by altering all pixels of the image from the original pixel values of the image 26*b* to random or predetermined pixel values other than the original pixel values while maintaining the values of all pixels within the featureless shape outline. The featureless mask image would thus be similar to the mask image 26*b*', however, the pixels within the mask image 26*b*' corresponding to the first porch 70*a*, the second porch 70*b*, and the garage 74 would be altered to random or predetermined pixel values other than their respective original pixel values so as to avoid causing interference with respect to the analysis of the roof of the structure 42.

Similarly, in another embodiment, a selection of one or more synthetic areas may be made to determine which synthetic areas are desired within the synthetic shape outline 154. By way of example, assuming the structure 42 had a roof 78 with asphalt shingles yet the garage 74 had a roof made of metal and it is desired to obtain a mask image showing only a portion of the roof 78 having asphalt shingles, synthetic areas 158*a*, 158*b*, 158*c* may be selected to form the synthetic shape area 158, the border of which forms the synthetic shape outline 154. By excluding the synthetic garage area 158*d* from the synthetic shape area 158, only the portion of structure 42 having the roof 78 with asphalt shingles may be isolated in the mask image 26*b'*.

Figure 8:
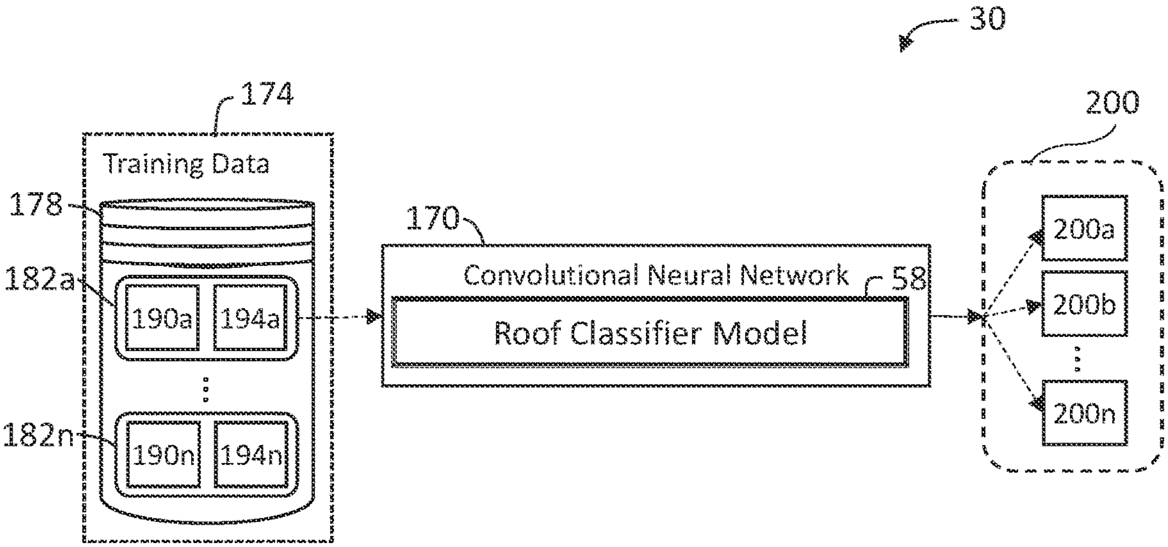
FIG. 8 is an exemplary embodiment of a convoluted neural network having a roof assessment model in accordance with the present disclosure.

Referring now to FIG. 8, shown therein is an exemplary embodiment of the roof classifier component 30 having a convolutional neural network 170 defining the roof classifier model 58. Also shown is a second training data 174 that may be stored in a second training database 178. The second training data may comprise roof classification training pairs 182*a-n*, each of which comprises a test masked image 190 and a truth roof classification 194. The second training data 174 includes a plurality of roof classification training pairs 182*a-n*. Each of the roof classification training pairs 182 includes a test masked image 190 (which may be an RGB image) and a truth roof classification 194. Each of the roof classification training pairs 182 are matched, that is, the test masked image 190*a* corresponds with the truth roof classification 194*a*, and the test masked image 190*n* corresponds with the truth roof classification 194*n*. The test masked images 190*a-n* may be the same as the mask image 26*b'*, and may be constructed using the feature mask generation component 22 as discussed above. Each of the test mask images 190*a-n* may then be analyzed to create the truth roof classification 194*a-n*. Defining the truth roof classification 194 within the roof classification training pairs 182 may be done manually by an operator using an operator computer having image processing software.

In this example, the operator may view the test masked image 190 on a monitor, for example, and then add labels indicative of the truth roof classification 194 of the roof 78 depicted within the test masked image 190. The labels indicative of the truth roof classification 194 can then be processed to determine the truth roof classification 194. Training the roof classifier model 58 with the test masked images 190*a-n* enhances the accuracy of the roof classifier model 58 by eliminating interference caused by any background pixels.

At the time of creating the second training data 174 and training the convolutional neural network 170, the characteristic that is desired to be assessed is identified within the truth roof classification 190*a-n* and a format for a roof classification 200 as output from the convolutional neural network 170 is determined. The format for the roof classification 200 of the convolutional neural network 170 is used as the format for the truth roof classification 194. Similarly, the characteristic that is desired to be assessed must match the characteristic of the truth roof classification 194 of the second training data 174.

Once the roof classifier model 58 has been trained, mask images 26*b'* showing structures 42 to be analyzed are provided to the roof classifier model 58. The roof classifier model 58 examines the mask image 26*b'*, determines the roof classification 200, and associates the roof classification 200 with the mask image 26*b'*, the structure 42, and/or a particular address or account identifying the structure 42. In some embodiments, the mask image 26*b'* shows the entire roof 78 of the structure 42, and is analyzed by the roof classifier model 58 in an entirety (as a whole) without segmenting the pixels depicting the roof 78 of the structure 42 into separate groups.

In one embodiment, the roof classification 200 comprises a number on a predetermined scale. By way of example only, the predetermined scale for the roof condition assessment may be from 0 to 10 wherein a 0 on the predetermined scale corresponds to the worse possible roof condition and a 10 on the predetermined scale corresponds to the best possible roof condition wherein the roof classification 200 may be either an integer or a decimal. In another embodiment, the roof classification 200 comprises a number of roof classification categories 200*a-n*.

For example only, roof condition classification categories 200*a-n* for the roof condition classification may include Good 200*a*, Fair 200*b*, Poor 200*c*, Damaged 200*d*, and Catastrophic 200*e*. While only five categories are noted here, it is understood that the number of categories could be greater or lesser than five and may be determined based on the granularity between conditions needed. For example, the number of categories could be decreased to two categories, Pass and Fail, for a less granular need. If the roof classification 200 comprises roof classification categories 200*a-n*, the roof classifier model 58 may select a single roof classification category 200 in which to classify the roof 78 in the mask image 26*b'*, or may determine a probability for each of a plurality of roof classification categories 200*a-n* that the roof 78 depicted in the mask image 26*b'* meets the requirements for that roof classification category.

For instance, in the example above, with the roof condition classification categories of Good 200*a*, Fair 200*b*, Poor 200*c*, Damaged 200*d*, and Catastrophic 200*e*, the roof classifier model 58 may determine the probability that the roof 78 depicted in the mask image 26*b'* has a 1% probability of being Good 200*a* (Probability P[0]), a 15% probability of being Fair 200*b* (Probability P[1]), a 51% probability of being Poor 200*c* (Probability P[2]), a 29% probability of being Damaged 200*d* (Probability P[3]), and a 4% probability of being Catastrophic 200*e* (Probability P[4]). In some embodiments, these five probabilities P[0]-P[4] may be provided to an algorithm that combines the probabilities to generate a composite probability that is a more granular label than any of the probabilities P[0]-P[4], individually.

The composite probability can be between 0-x (where x is greater than the number of classifications, for example). In this example, the label 0 may be the worst roof and the label x may be the best roof. If x=100, for example, the five probabilities P[0]-P[4] are combined to determine the composite probability being within the scale of 0-100 thereby increasing a first granularity of the composite probability relative to a second granularity of the individual probabilities by 20 times. In some embodiments, the algorithm may be a linear algorithm of the form $P_{EV}=p[0]*w_2+p[1]*w_1 \ldots +p[n]*w_n$ where p[0]-p[n] are the probabilities of the roof classification categories; and $w_1$ to $w_n$ are weightings.

Once the composite probability is determined, the composite probability can be related to a particular roof condition classification. For example, there may be a simplified range based on overt roof classification categories assigned within the range from 0 to x. For example, if 0 is a completely damaged roof, 25 is a poor roof, 75 is a fair roof, and 100 is a perfectly new roof. The roof model may be only supervised against these 4 classes since they are ‘easy’ to differentiate holistically. Therefore, the granular scale is then an interpolative scale that factors in the confidence of the machine learning prediction to provide an ‘in-between’ score. For example, a roof may be given confidence scores of {class 0: 0.85, class 25: 0.1, class 75: 0.05, and class 100: 0}. For example, in the granular algorithm, the interpolated score bay be a class 15, which would be somewhere between poor and damaged based on the model uncertainty.

The roof classification 200 and the truth roof classification 194 may have the same format, that is, if the truth roof classification 194 is a probability for each category in a set of categories, then the roof classification 200 may also be a probability for each category in a set of categories.

The convolutional neural network 170 must be trained to create the roof classifier model 58. To train the convolutional neural network 170, the convolutional neural network 170 analyzes the test masked image 190*a* of first roof classification training pair 182*a* and determines a test roof classification. In some embodiments, the test masked image 190*a*, for example, shows the entire roof 78 of the structure 42, and is analyzed by the convolutional neural network 170 as a whole without segmenting the pixels depicting the roof 78 of the structure 42 into separate groups. The test roof classification is then compared to the truth roof classification 194*a*. Based on the comparison between the test roof classification and the truth roof classification 194*a*, the weighted values between the neurons of each layer of the convolutional neural network 170 may be adjusted through backpropagation.

The convolutional neural network 170 then analyzes the test masked image 190*b* of second roof classification training pair 182*b* and determines a second test roof classification in a similar manner as the convolutional neural network 170 analyzes the test masked image 190*a*. The second test roof classification is then compared to the truth roof classification 194*b*. Based on the comparison between the test roof classification and the truth roof classification 194*b*, the weighted values between the neurons of each layer of the convolutional neural network 170 may again be adjusted through backpropagation. This process is repeated for each roof classification training pair 182*a-n* in the second training data 174, and in some embodiments, this process is repeated multiple times for the second training data 174.

During the training process, statistics, such as accuracy of the test roof classification when compared to the truth roof classification, are kept detailing a statistical confidence level of the convolutional neural network 170. The convolutional neural network 170 is considered to be trained when the statistical confidence level of the roof classifier model 58 meets or exceeds a predetermined minimum confidence level.

Figure 9:
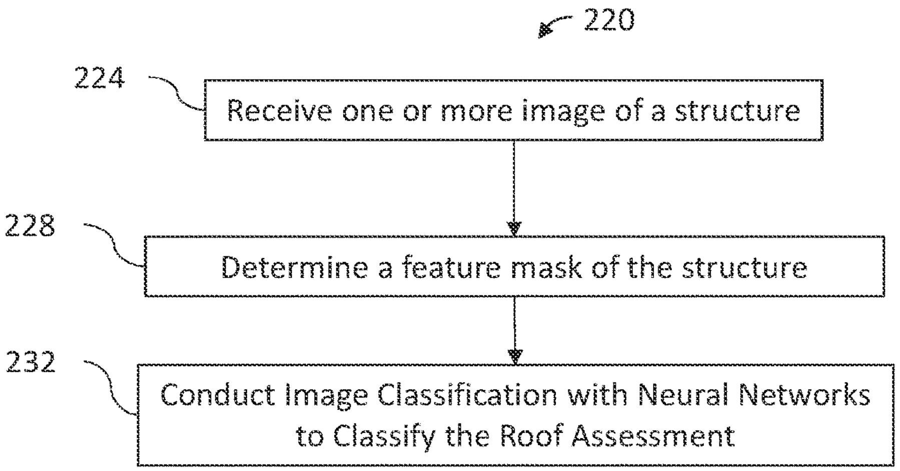
FIG. 9 is a process flow diagram of an exemplary embodiment of a roof classification assessment method in accordance with the present disclosure.

Referring now to FIG. 9, shown therein is process flow diagram 220 of an exemplary embodiment of a roof classification assessment method in accordance with the present disclosure. The roof classification assessment method generally includes receiving one or more image of a structure (step 224), determining a feature mask of the structure (step 228), and conducting image classification with neural networks to classify the roof assessment (step 232).

Figure 10:
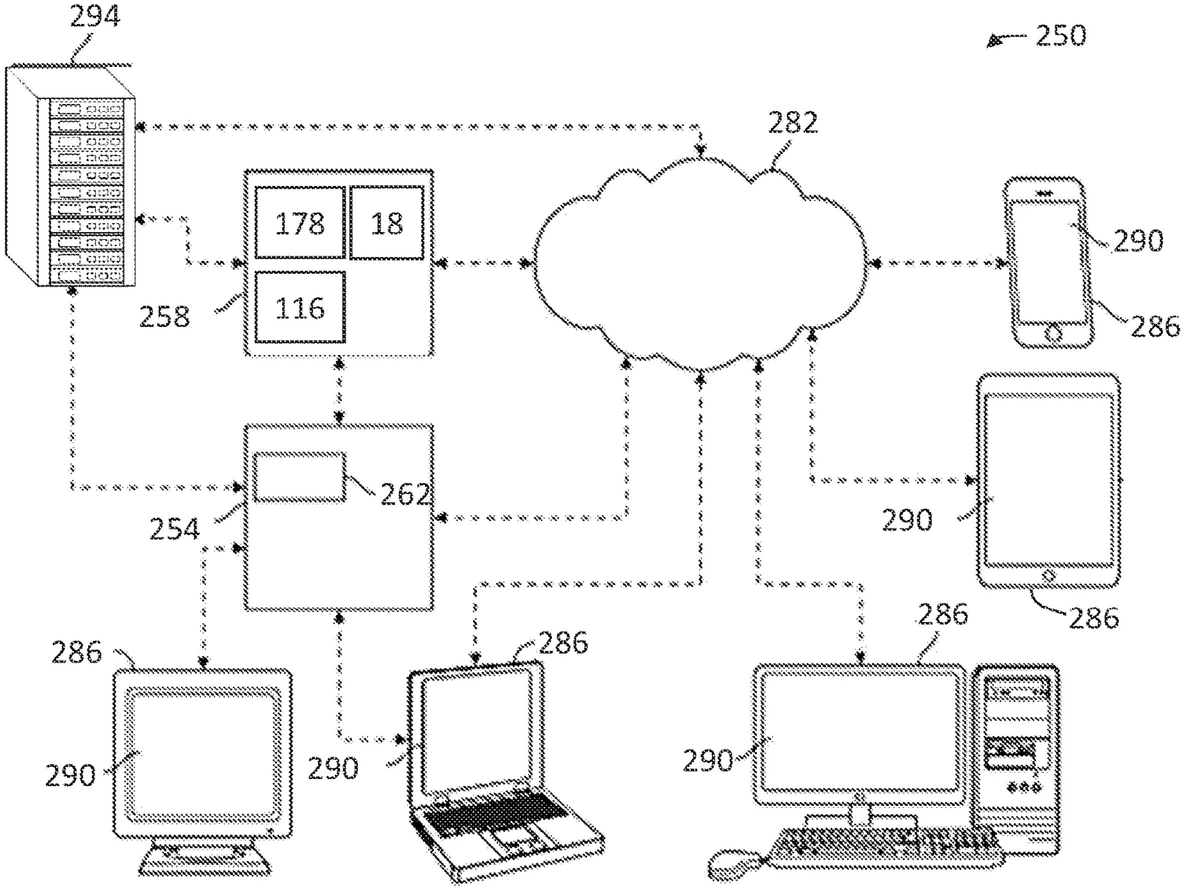
FIG. 10 is an exemplary embodiment of a computer system implementing the roof classification assessment method of FIG. 9.

In one embodiment, as shown in FIG. 10, the roof classification assessment system may be carried out on one or more computer system 250. The computer system 250 may comprise one or more computer processor 254, and one or more non-transitory memory 258. As shown in FIG. 9, the computer processor 254 may include (or be communicatively coupled with) one or more communication component 262. The non-transitory memory 258 may store the image database 18, the training database 116, and the second training database 178. The image database 18, the training database 116, and the second training database 178 may be separate databases, or may be integrated into a single database. The computer system 250 may include a network 282 enabling bidirectional communication between the computer processor 254 and the non-transitory memory 258 with a plurality of user devices 286. The user devices 286 may communicate via the network 282 and/or may display information on a screen 290. The computer processor 254 or multiple computer processors 254 may or may not necessarily be located in a single physical location.

In one embodiment, the network 282 is the Internet and the user devices 286 interface with the computer processor 254 via the communication component 262 using a series of web pages. It should be noted, however, that the network 282 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer processor 254 and the non-transitory memory 258 may be implemented with a server system 294 having multiple servers in a configuration suitable to provide a commercial computer-based business system such as a commercial web-site and/or data center.

The results of the roof classification assessment system 10 may be used for a wide variety of real-world applications with respect to the structure 42. Non-exclusive examples of such applications include use of the results to determine a tax assessment, provide and/or complete inspections, to evaluate condition, to repair, to create under-writing, to insure, to purchase, to construct, or to value the structure 42.

For example, a municipality may tax real estate property based on the size and type of structures 42 located on the property. Detecting and determining roof characteristics, classifications, and/or condition may be used to adjust such taxes. As another example, municipalities may require building permits for changes to structures 42. Detecting and determining roof characteristics, classifications, and/or condition may be used to monitor such changes. As yet another example, insurance companies may underwrite structures 42 with roofs and/or pay for repair of roofs based at least in part on roof characteristics, classifications, and/or condition. Detecting and determining roof characteristics, classifications, and/or condition may be used to create and/or monitor insurance underwriting or assessment.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For exemplary purposes, examples of structures 42 and 46 of residential structures have been used. However, it is to be understood that the example is for illustrative purposes only and is not to be construed as limiting the scope of the invention.

What is claimed is:

1. A non-transitory computer readable medium storing computer executable code that when executed by a processor cause the processor to:

receive an image of a structure having an outline and a roof with one or more characteristics, the image having pixels with first pixel values depicting the structure and second pixel values outside of the structure depicting a background of a geographic area surrounding the structure, and image metadata including first geolocation data;

generate a synthetic shape image of the structure from the image using a first machine learning algorithm, the synthetic shape image including pixels having pixel values forming a synthetic shape of the outline, the synthetic shape image having second geolocation data derived from the first geolocation data;

map the synthetic shape onto the image of the structure, based at least in part on the first and second geolocation data, and change the second pixel values of the image so as to not depict the background of the geographic area outside of the structure forming a mask image; and, assess one or more characteristics of the roof based at least in part on the first pixel values with a second machine learning algorithm and resulting in a plurality of probabilities, with each of the probabilities for a respective roof condition classification category, and determining a composite probability based upon the plurality of probabilities so as to classify the one or more characteristics of the roof.

2. The non-transitory computer readable medium storing computer executable code of claim 1, wherein the one or more characteristics includes a roof condition.

3. The non-transitory computer readable medium storing computer executable code of claim 1, wherein the one or more characteristics includes a roof architecture.

4. The non-transitory computer readable medium storing computer executable code of claim 1, wherein the one or more characteristics includes a roof material.

5. The non-transitory computer readable medium storing computer executable code of claim 1, wherein the one or more characteristics includes a roof tree coverage.

6. The non-transitory computer readable medium storing computer executable code of claim 1, wherein the one or more characteristics includes a roof solar panel coverage.

7. The non-transitory computer readable medium of claim 1, wherein the image has a pixel resolution between two and ten inches per pixel.

8. The non-transitory computer readable medium of claim 1, wherein the first machine learning algorithm is a component of a generator of a generative adversarial network, the generative adversarial network further comprising a discriminator having a third machine learning algorithm, the generator receiving the image of the structure and generating the synthetic shape image.

9. The non-transitory computer readable medium of claim 8, wherein the roof is a first roof, and the structure is a first structure, and wherein the generative adversarial network has been trained with truth pairs with each truth pair including a test masked image only depicting a second roof of a second structure and a truth roof classification.

10. The non-transitory computer readable medium of claim 9, wherein the test masked image depicts an entirety of the second roof of the second structure.

11. A method, comprising:

receiving, with one or more processors, an image of a structure having an outline and a roof with one or more characteristics, the image having pixels with first pixel values depicting the structure and second pixel values outside of the structure depicting a background of a geographic area surrounding the structure, and image metadata including first geolocation data;

generating, with the one or more processors, a synthetic shape image of the structure from the image using a first machine learning algorithm, the synthetic shape image including pixels having pixel values forming a synthetic shape of the outline, the synthetic shape image having second geolocation data derived from the first geolocation data;

mapping, with the one or more processors, the synthetic shape onto the image of the structure, based at least in part on the first and second geolocation data, and change the second pixel values of the image so as to not depict the background of the geographic area outside of the structure forming a mask image; and, assessing, with the one or more processors, one or more characteristics of the roof based at least in part on the first pixel values with a second machine learning algorithm and resulting in a plurality of probabilities, with each of the probabilities for a respective roof condition classification category, and determining a composite probability based upon the plurality of probabilities so as to classify the one or more characteristics of the roof.

12. The method of claim 11, wherein the one or more characteristics includes a roof condition.

13. The method of claim 11, wherein the one or more characteristics includes a roof architecture.

14. The method of claim 11, wherein the one or more characteristics includes a roof material.

15. The method of claim 11, wherein the one or more characteristics includes a roof tree coverage.

16. The method of claim 11, wherein the one or more characteristics includes a roof solar panel coverage.

17. The method of claim 11, wherein the first machine learning algorithm is a component of a generator of a generative adversarial network, the generative adversarial network further comprising a discriminator having a third machine learning algorithm, the generator receiving the image of the structure and generating the synthetic shape image.

18. The method of claim 17, wherein the roof is a first roof, and the structure is a first structure, and wherein the generative adversarial network has been trained with truth pairs with each truth pair including a test masked image only depicting a second roof of a second structure and a truth roof classification.

19. The method of claim 18, wherein the test masked image depicts an entirety of the second roof of the second structure.

* * * * *